(12) United States Patent
Nishi et al.

(10) Patent No.: US 7,307,407 B2
(45) Date of Patent: Dec. 11, 2007

(54) POWER SUPPLY APPARATUS

(75) Inventors: Koji Nishi, Kyoto (JP); Soichi Watanabe, Nagaokakyo (JP); Takashi Kurokawa, Nagaokakyo (JP)

(73) Assignee: Murata Manufacturing Co., Ltd., Kyoko (JP)

( * ) Notice: Subject to any disclaimer, the term of this patent is extended or adjusted under 35 U.S.C. 154(b) by 0 days.

(21) Appl. No.: 11/624,758

(22) Filed: Jan. 19, 2007

(65) Prior Publication Data

US 2007/0164718 A1 Jul. 19, 2007

Related U.S. Application Data

(63) Continuation of application No. PCT/JP2006/315313, filed on Aug. 2, 2006.

(30) Foreign Application Priority Data

Aug. 3, 2005 (JP) ............................. 2005-225177

(51) Int. Cl.
*H02M 3/158* (2006.01)
(52) U.S. Cl. ........................ 323/350; 323/271; 323/351
(58) Field of Classification Search ................ 323/271, 323/282, 350, 351
See application file for complete search history.

(56) References Cited

U.S. PATENT DOCUMENTS

| 5,506,493 | A | * | 4/1996 | Stengel | ........................ | 323/223 |
|---|---|---|---|---|---|---|
| 5,912,552 | A | | 6/1999 | Tateishi | | |
| 6,693,412 | B2 | * | 2/2004 | Ruan et al. | .................. | 323/282 |
| 6,707,281 | B2 | * | 3/2004 | Solivan | ....................... | 323/225 |
| 6,710,582 | B2 | | 3/2004 | Watanabe | | |
| 6,922,043 | B2 | * | 7/2005 | Manabe et al. | ............. | 323/283 |
| 7,061,218 | B2 | * | 6/2006 | Ito | .............................. | 323/351 |
| 2003/0048097 | A1 | | 3/2003 | Ishihara et al. | | |

FOREIGN PATENT DOCUMENTS

| JP | 10-225105 A | 8/1998 |
|---|---|---|
| JP | 2003-033015 A | 1/2003 |
| JP | 2003-088100 A | 3/2003 |
| JP | 2003-189602 A | 7/2003 |

OTHER PUBLICATIONS

Official Communication for PCT Application No. PCT/JP2006/315313; mailed on Sep. 12, 2006.

* cited by examiner

*Primary Examiner*—Jeffrey Sterrett
(74) *Attorney, Agent, or Firm*—Keating & Bennett, LLP

(57) ABSTRACT

In a power supply apparatus, in a standby mode, control signals for controlling a first MOSFET of a power supply apparatus to be turned on and a second MOSFET to be turned off are supplied to the gates of the first and second MOSFETs from a control circuit, respectively. The emitter of a PNP transistor is connected to the gate of the second MOSFET through a diode of a switch circuit and the collector is connected to the ground. A power supply operation control signal is input to the base of the PNP transistor. When a power supply operation control signal in a Low state is input to the base in a standby mode, the emitter and the collector are connected to each other. Accordingly, the gate of the second MOSFET has a potential substantially the same as a ground potential and the second MOSFET is turned off irrespective of the control signal.

14 Claims, 2 Drawing Sheets

POWER SUPPLY OPERATION
CONTROL SIGNAL

POWER SUPPLY APPARATUS

BACKGROUND OF THE INVENTION

1. Field of the Invention

The present invention relates to switching power supply apparatuses, and more particularly, to a switching power supply apparatus used for turning on a high-voltage discharge lamp operated by applying direct current.

2. Description of the Related Art

Switching power supply apparatuses including a DC-DC converter as a fundamental circuit are available and various power supply apparatuses for a high-pressure discharge lamp have been designed, for example. Note that, in the following description of a known power supply apparatus, only components which relate to the present invention are briefly described and the complete detailed description of the entire apparatus is omitted hereinafter.

FIG. 3 is a circuit diagram of a power supply apparatus 30 including a DC-DC converter disclosed in Japanese Unexamined Patent Application Publication No. 2003-189602 (Patent Document 1).

In the power supply apparatus 30 disclosed in Patent Document 1, a MOSFET Q1 defining a switching element, a resonant coil L2, and a choke coil L1 are connected to one another in series between one end of a direct current power supply Vin and one end of an output terminal Po. A rectifier diode D1 is connected between one end, which is closer to the resonant coil L2, of the choke coil L1, the direct current power supply Vin, and the other end of the output terminal Po. The power supply apparatus 30 is configured such that a series circuit including the resonant coil L2 and the rectifier diode D1 connected to each other in series is connected in parallel to a series circuit including a capacitor C5 and a MOSFET Q2 defining a switching element connected to each other in series. The power supply apparatus 30 includes a control circuit 11 for controlling the MOSFET Q1 and the MOSFET Q2 so as not to be turned on simultaneously, but rather, to be turned on alternately with a predetermined dead time.

The power supply apparatus 30 may be controlled to be selectively switched between an operation mode and a standby mode in accordance with a power supply operation control signal supplied from a system in which the power supply apparatus 30 is included. In the standby mode, control is typically stopped, after the MOSFET Q1 is controlled to be turned off and the MOSFET Q2 is controlled to be turned on.

However, in the standby mode of the known power supply apparatus 30, when the MOSFET Q1 is damaged due to a short circuit, the following problems arise.

In the standby mode, since the MOSFET Q2 is normally turned on, a connection point of the capacitor C5 and the MOSFET Q2 has a potential substantially the same as the ground potential. Therefore, in the power supply apparatus 30 shown in FIG. 3, when the MOSFET Q1 is short-circuited, that is, when the MOSFET Q1 is turned on as described above, an input voltage Vin is directly applied to the capacitor C5. Since the capacitor C5 is not designed to have a large amount of voltage is applied thereto, a capacitor having low voltage resistance is normally used as the capacitor C5. Accordingly, the capacitor C5 may be damaged when an input voltage Vin is directly applied thereto.

If voltage resistance and allowable current of an element that may be damaged as described above are increased, the probability of the damage is reduced. However, the cost and size of each element is increased.

SUMMARY OF THE INVENTION

To overcome the problems described above, preferred embodiments of the present invention provide a power supply apparatus that includes circuit elements having similar reliabilities to known circuit elements. Thus, even when the MOSFET Q1 is damaged in a standby mode, the other circuit elements included in the power supply apparatus are prevented from being damaged.

A power supply apparatus according to a preferred embodiment of the present invention includes a rectifier diode and a choke coil, one end of the rectifier diode and one end of the choke coil being connected to each other, a first switch element having one end connected to a connection point of the rectifier diode and the choke coil through a resonant coil, a first diode connected in parallel to the first switch element, a series circuit including a first capacitor and a second switch element, the series circuit being connected in parallel to a series circuit including the resonant coil and the rectifier diode, a second diode connected in parallel to the second switch element, parallel capacitors connected to the first switch element, the second switch element, and the rectifier diode, and a control circuit arranged to control the first switch element and the second switch element so as not to be turned on or off simultaneously, but to be turned on or off alternately. In this power supply apparatus, the control circuit outputs a signal to control the first switch element to be turned off and the second switch element to be turned on in a standby mode. The power supply apparatus includes a switching circuit arranged to control the second switch element to be turned off in the standby mode in accordance with an input power supply operation control signal.

A power supply apparatus according to another preferred embodiment of the present invention includes a rectifier diode and a choke coil, one end of the rectifier diode and one end of the choke coil are connected to each other, a first switch element having one end connected to a connection point of the rectifier diode and the choke coil through a resonant coil, a first diode connected in parallel to the first switch element, a series circuit including a first capacitor and a second switch element, the series circuit being connected in parallel to a series circuit including the resonant coil and the rectifier diode, a second diode connected in parallel to the second switch element, parallel capacitors connected to the first switch element, the second switch element, and the rectifier diode, a first resistor or a series circuit including the first resistor and a third diode connected to each other which is connected in parallel to the first capacitor, and a control circuit arranged to control the first switch element and the second switch element so as not to be turned on or off simultaneously, but to be turned on or off alternately. In this power supply apparatus, the control circuit outputs a signal to control the first switch element to be turned off and the second switch element to be turned on in a standby mode. The power supply apparatus includes a switching circuit arranged to control the second switch element to be turned off in the standby mode in accordance with an input power supply operation control signal.

With this configuration, even when the first switch element is turned on in a standby mode, the second switch element is normally turned off in a standby mode. Accordingly, current supplied through the first switch element to the power supply apparatus does not flow through the second switch element and an input voltage is not applied to the first capacitor connected to the second switch element in series. Furthermore, current does not flow through the first resistor or the series circuit including the first resistor and the third diode being connected in parallel to the first capacitor.

The switching circuit in the power supply apparatus according to preferred embodiments of the present invention includes a fourth diode having one end connected to a connection point of a control terminal of the second switch element and the control circuit, and a PNP transistor having an emitter connected to the other end of the fourth diode, a collector connected to ground, and a base to which the power supply operation control signal, which is in a Low state in the standby mode and in a Hi state in an operation mode, is input.

With this configuration, specifically, a power supply operation control signal in a Low state is input to the gate of the PNP transistor of the switching circuit in a standby mode. Accordingly, the PNP transistor is turned on and the second switch element is turned off since a control terminal of the second switch element is connected to the ground. On the other hand, in an operation starting mode or in an operation mode, a power supply operation control signal in a Hi state is input to the PNP transistor. Accordingly, the PNP transistor is turned off and a control signal is supplied from the control circuit to the control terminal of the second switch element, whereby the second switch element is subjected to on/off control in accordance with the control signal supplied from the control circuit.

According to preferred embodiments of the present invention, the second switch element is securely turned off in a standby mode. Accordingly, it is not necessary to improve the reliability on voltage resistance of circuit elements, and when the fist switch element is damaged because of a short circuit, other circuit elements in the power supply apparatus are prevented from being damaged.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A power supply apparatus according to a first preferred embodiment of the present invention will now be described with reference to FIG. 1.

Figure 1:
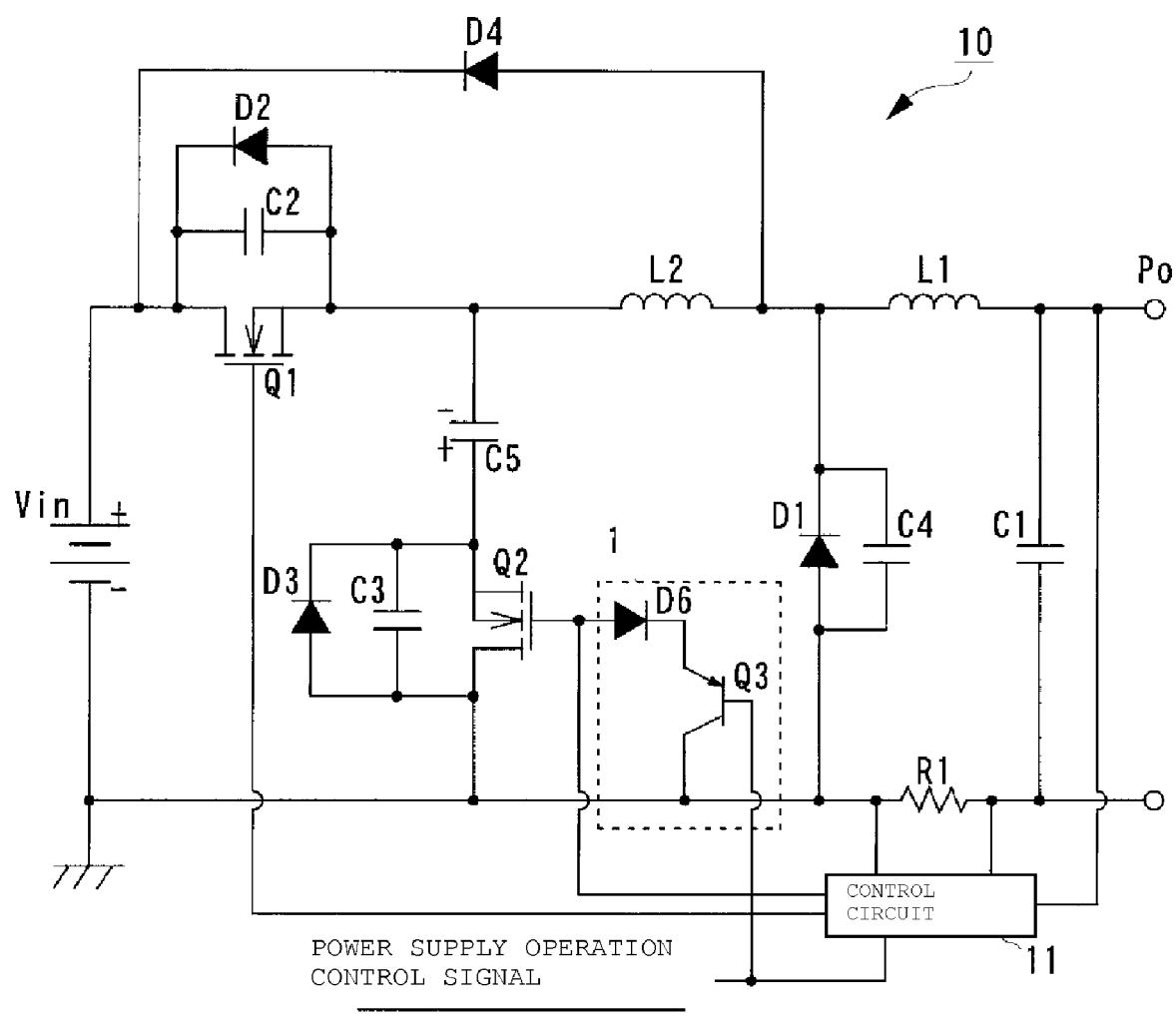
FIG. 1 is a circuit diagram illustrating a power supply apparatus 10 according to a first preferred embodiment of the present invention.

FIG. 1 is a circuit diagram illustrating a power supply apparatus 10 according to the first preferred embodiment of the present invention.

A positive electrode of a direct current power supply Vin is connected to the drain of a MOSFET Q1 defining a first switch element, and a negative electrode of the direct current power supply Vin is connected to the ground. The source of the MOSFET Q1 is connected to a first end of a choke coil L1 through a resonant coil L2. A second end of the choke coil L1 is connected to a first end of an output terminal Po. A second end of the output terminal Po is connected to the ground through a resistor R1 for detection of current. A smoothing capacitor C1 is connected between the first and second ends of the output terminal Po.

The cathode of a rectifier diode D1 is connected to the first end of the choke coil L1 and the anode of the rectifier diode D1 is connected to the ground. A series circuit including the resonant coil L2 and the rectifier diode D1 connected in series to each other are connected in parallel to a series circuit including a first capacitor C5 and a MOSFET Q2 defining a second switch element connected in series to each other.

A diode D2 as a first diode is connected between the drain and the source of the MOSFET Q1 in parallel to the MOSFET Q1, and a diode D3 as a second is connected between the drain and source of the MOSFET Q2 in parallel to the MOSFET Q2. The diodes D2 and D3 preferably are body diodes for the MOSFET Q1 and the MOSFET Q2, respectively.

A capacitor C2 is connected between the drain and source of the MOSFET Q1 in parallel to the MOSFET Q1, and a capacitor C3 is connected between the drain and source of the MOSFET Q2 in parallel to the MOSFET Q2. The capacitor C2 is a junction capacitor for the drain and source of the MOSFET Q1 and the capacitor C3 is a junction capacitor for the drain and source of the MOSFET Q2. That is, the capacitors C2 and C3 are parallel capacitors. A capacitor C4 is connected between the anode and cathode of the rectifier diode D1 in parallel to the rectifier diode D1. The capacitor C4 is a junction capacitor for the anode and cathode of the rectifier diode D1. That is, the capacitor C4 is a parallel capacitor.

A diode D4 is connected in parallel to a series circuit including the resonant coil L2 and the diode D2 connected in series to each other. The diode D4 includes the cathode connected to the diode D2 and the anode connected to the resonant coil L2.

A control circuit 11, which controls the MOSFET Q1 and the MOSFET Q2 to be turned on or off alternately with a predetermined dead time, is connected to opposite ends of the resistor R1. An input terminal of the control circuit 11 is connected to the first end of the output terminal Po (the choke coil L1 side) and an output terminal of the control circuit 11 is connected to the gate of the MOSFET Q1 and the gate of the MOSFET Q2.

The gate of the MOSFET Q2 is connected to the control circuit 11 and a switch circuit 1.

The switch circuit 1 includes a diode D6 as a fourth diode, which is connected to the gate of the MOSFET Q2 through an anode thereof, and a PNP transistor Q3, the emitter of which is connected to the cathode of the diode D6, the collector of which is connected to the ground, and the base of which is input with a power supply operation control signal. The power supply operation control signal is also input to the control circuit 11.

A power supply operation control signal in a Low state is input to the power supply apparatus 10 configured as described above in a standby mode. When the power supply operation control signal is in the Low state, the control circuit 11 supplies a control signal to turn off the MOSFET Q1 and a control signal to turn on the MOSFET Q2 to the gate of the MOSFET Q1 and the gate of the MOSFET Q2, respectively.

When the power supply operation control signal is in a Low state, the base of the PNP transistor Q3 in the switch circuit 1 is in a Low state. Therefore, the PNP transistor Q3 is turned on and the emitter and the collector of the PNP transistor Q3 are connected to each other, whereby the gate of the MOSFET Q2 is connected to the ground through the diode D6 and the PNP transistor Q3. Accordingly, even when the control circuit 11 supplies a control signal to turn on the MOSFET Q2, the MOSFET Q2 is turned off since the gate of the MOSFET Q2 has a potential substantially the same as a ground potential. That is, the drain and source of the MOSFET Q2 are disconnected from each other in the standby mode. Consequently, as described in the Description of the Related Art, even when the MOSFET Q1 is damaged due to a short circuit, current does not flow into the MOSFET Q2, which prevents the MOSFET Q2 from being damaged. Furthermore, direct current voltage is not directly applied from the direct current power supply Vin to the capacitor C5, which prevents the capacitor C5 from being damaged.

When the power supply apparatus 10 as described above is operated, since a power supply operation control signal is in a Hi state, the base of the PNP transistor Q3 in the switch circuit 1 is in a Hi state. Accordingly, the PNP transistor Q3 is turned off and the emitter and the collector are disconnected from each other. Then, the gate of the MOSFET Q2 is disconnected from the ground and the MOSFET Q2 is turned on or off in accordance with a control signal supplied from the control circuit 11. Consequently, the power supply apparatus 10 is subjected to PWM control.

With the configuration of the preferred embodiment described above, even when the MOSFET Q1 (first switch element) is damaged due to a short circuit in a standby mode, damage to other circuit elements is prevented without having to replace the circuit elements with circuit elements having greater reliability.

As a transistor used for switching, an NPN transistor can be used as long as a logical inversion circuit is provided in a prior stage of a control terminal of the transistor or as long as a power supply operation control signal is logically inverted.

A power supply apparatus according to a second preferred embodiment of the present invention will next be described with reference to FIG. 2.

Figure 2:
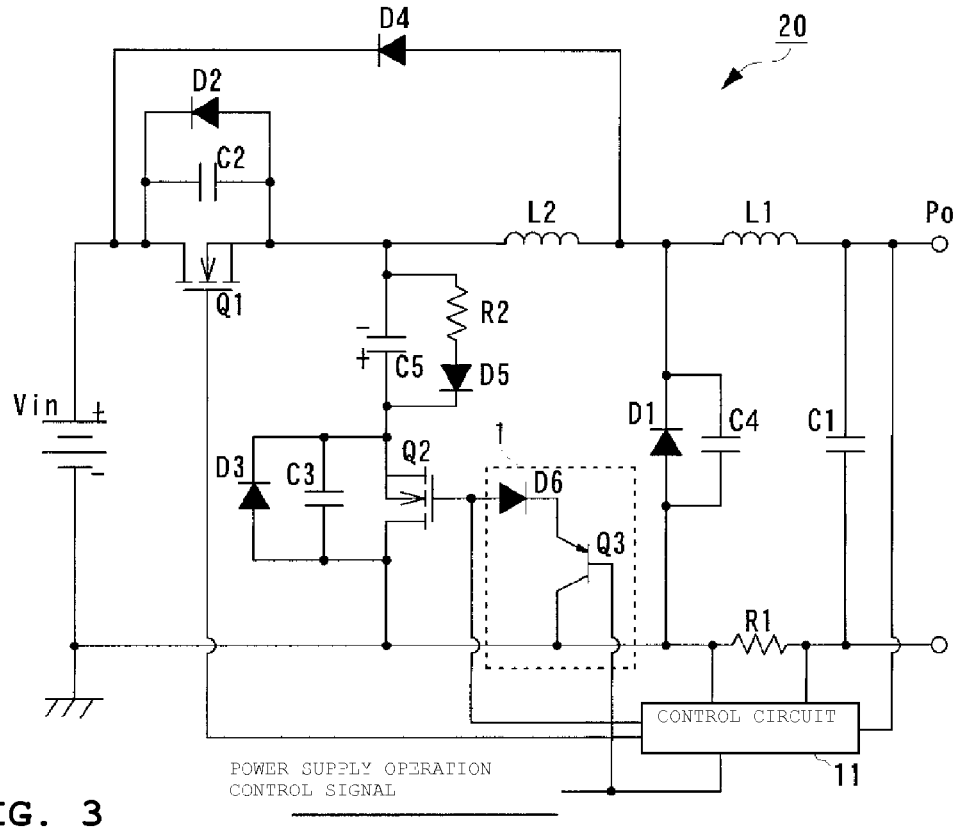
FIG. 2 is a circuit diagram illustrating a power supply apparatus 20 according to a second preferred embodiment of the present invention.
Figure 3:
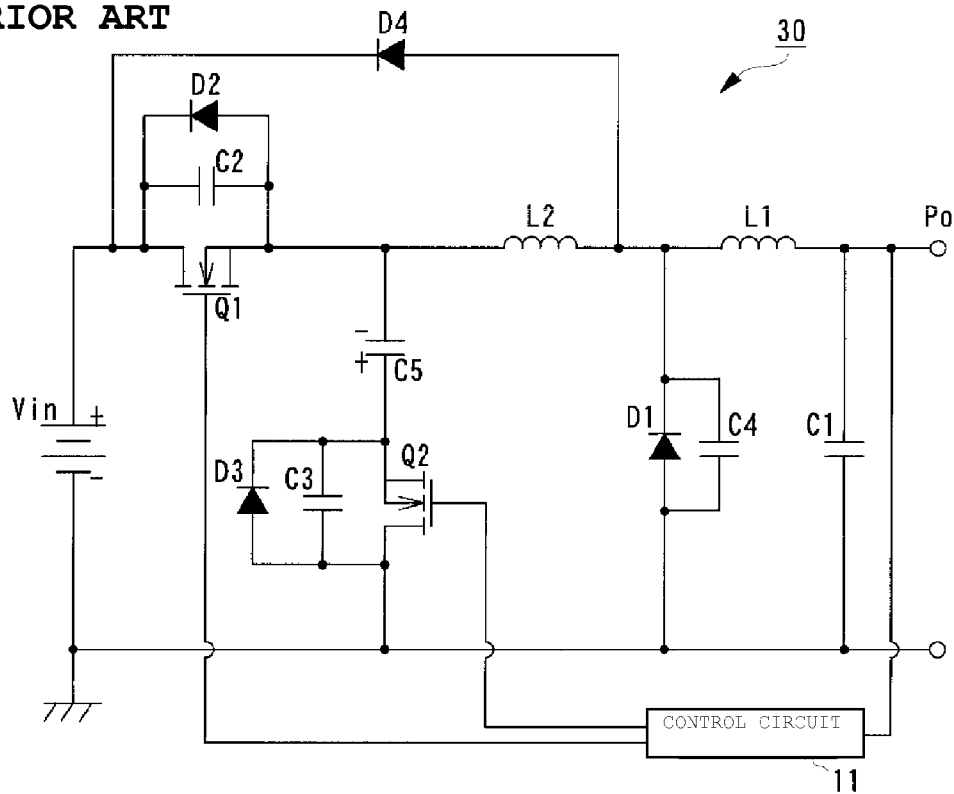
FIG. 3 is a circuit diagram illustrating a known power supply apparatus 30.

FIG. 2 is a circuit diagram illustrating a power supply apparatus 20 according to the second preferred embodiment of the present invention.

The power supply apparatus of the second preferred embodiment preferably includes a series circuit including a resistor R2 as a first resistor and a diode D5 as a third diode connected to each other in series that is additionally connected in parallel to a capacitor C5 of the power supply apparatus according to the first preferred embodiment. The cathode of the diode D5 is connected to the capacitor C5 in a MOSFET Q2 side and the anode of the diode D5 is connected to the capacitor C5 in a MOSFET Q1 side through the resistor R2.

If the power supply apparatus having the configuration described above does not include the switch circuit 1 shown in this preferred embodiment, when the MOSFET Q1 is damaged due to a short circuit in a standby mode, an input voltage Vin is applied to the series circuit including the resistor R2 and the diode D5 connected in series to each other, which is further connected in parallel to the capacitor C5. Accordingly, a substantial amount of direct current is supplied to the MOSFET Q2. Since the MOSFET Q2 is designed not to receive direct current, allowable current is relatively small. Therefore, when a substantial amount of direct current is supplied to the MOSFET Q2, the MOSFET Q2 may be damaged. Furthermore, the resistor R2 and the diode D5 may be damaged.

However, the configuration of this preferred embodiment prevents the MOSFET Q2 from being damaged and prevents direct current from flowing through the resistor R2 and the diode D5. Accordingly, the circuit elements are prevented from being damaged.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A power supply apparatus comprising:
 a rectifier diode and a choke coil, one end of the rectifier diode and one end of the choke coil being connected to each other;
 a first switch element having one end connected to a connection point of the rectifier diode and the choke coil through a resonant coil;
 a first diode connected in parallel to the first switch element;
 a series circuit including a first capacitor and a second switch element, the series circuit being connected in parallel to a series circuit including the resonant coil and the rectifier diode;
 a second diode connected in parallel to the second switch element;
 parallel capacitors connected to the first switch element, the second switch element, and the rectifier diode; and
 a control circuit arranged to control the first switch element and the second switch element so as not to be turned on or off simultaneously, but to be turned on or off alternately; wherein
 the control circuit outputs a signal to control the first switch element to be turned off and the second switch element to be turned on in a standby mode; and
 the power supply apparatus further comprises:
 a switching circuit arranged to control the second switch element to be turned off in the standby mode in accordance with an input power supply operation control signal.

2. The power supply apparatus according to claim 1, wherein the switching circuit includes:
 a fourth diode having one end connected to a connection point of a control terminal of the second switch element and the control circuit; and
 a PNP transistor having an emitter connected to the other end of the fourth diode, a collector connected to ground, and a base to which the power supply operation control signal, which is in a Low state in the standby mode and in a High state in an operation mode, is input.

3. The power supply apparatus according to claim 1, wherein the first switch element is a MOSFET.

4. The power supply apparatus according to claim 3, wherein the first diode is connected between a drain and a source of the MOSFET.

5. The power supply apparatus according to claim 1, wherein the second switch element is a MOSFET.

6. The power supply apparatus according to claim 5, wherein the second diode is connected between a drain and a source of the MOSFET.

7. The power supply apparatus according to claim 5, wherein a gate of the MOSFET is connected to the control circuit and the switching circuit.

8. A power supply apparatus comprising:
a rectifier diode and a choke coil, one end of the rectifier diode and one end of the choke coil being connected to each other;
a first switch element having one end connected to a connection point of the rectifier diode and the choke coil through a resonant coil;
a first diode connected in parallel to the first switch element;
a series circuit including a first capacitor and a second switch element, the series circuit being connected in parallel to a series circuit including the resonant coil and the rectifier diode;
a second diode connected in parallel to the second switch element;
parallel capacitors connected to the first switch element, the second switch element, and the rectifier diode;
one of a first resistor and a series circuit including the first resistor and a third diode connected to each other which is connected in parallel to the first capacitor; and
a control circuit arranged to control the first switch element and the second switch element so as not to be turned on or off simultaneously, but to be turned on or off alternately; wherein
the control circuit outputs a signal to control the first switch element to be turned off and the second switch element to be turned on in a standby mode; and
the power supply apparatus further comprises:
a switching circuit arranged to control the second switch element to be turned off in the standby mode in accordance with an input power supply operation control signal.

9. The power supply apparatus according to claim 8, wherein the switching circuit includes:

a fourth diode having one end connected to a connection point of a control terminal of the second switch element and the control circuit; and a PNP transistor having an emitter connected to the other end of the fourth diode, a collector connected to ground, and a base to which the power supply operation control signal, which is in a Low state in the standby mode and in a High state in an operation mode, is input.

10. The power supply apparatus according to claim 9, wherein the first switch element is a first MOSFET.

11. The power supply apparatus according to claim 10, wherein the first diode is connected between a drain and a source of the first MOSFET.

12. The power supply apparatus according to claim 8, wherein the second switch element is a second MOSFET.

13. The power supply apparatus according to claim 12, wherein the second diode is connected between a drain and a source of the second MOSFET.

14. The power supply apparatus according to claim 12, wherein a gate of the second MOSFET is connected to the control circuit and the switching circuit.

* * * * *